United States Patent
Charbonneau et al.

(10) Patent No.: US 10,654,740 B2
(45) Date of Patent: May 19, 2020

(54) SUBMERGED COMBUSTION BURNERS, MELTERS, AND METHODS OF USE

(71) Applicant: JOHNS MANVILLE, Denver, CO (US)

(72) Inventors: Mark William Charbonneau, Highlands Ranch, CO (US); Alessandro G Borsa, Evergreen, CO (US)

(73) Assignee: Johns Manville, Denver, CO (US)

( * ) Notice: Subject to any disclaimer, the term of this patent is extended or adjusted under 35 U.S.C. 154(b) by 728 days.

(21) Appl. No.: 14/785,325

(22) PCT Filed: May 22, 2013

(86) PCT No.: PCT/US2013/042153
§ 371 (c)(1),
(2) Date: Oct. 17, 2015

(87) PCT Pub. No.: WO2014/189501
PCT Pub. Date: Nov. 27, 2014

(65) Prior Publication Data
US 2016/0075586 A1    Mar. 17, 2016

(51) Int. Cl.
*F23M 3/04* (2006.01)
*C03B 5/235* (2006.01)
(Continued)

(52) U.S. Cl.
CPC .......... *C03B 5/2356* (2013.01); *C03B 5/1672* (2013.01); *C03B 5/1675* (2013.01);
(Continued)

(58) Field of Classification Search
CPC ....................................................... F23D 14/78
(Continued)

(56) References Cited

U.S. PATENT DOCUMENTS 1,706,857 A    3/1929   Mathe
2,174,533 A   10/1939   See et al.
(Continued)

FOREIGN PATENT DOCUMENTS

DE    100 29 983 C2    9/2003
EP    1 337 789 B1    12/2004
(Continued)

OTHER PUBLICATIONS

"Glass Technologies—The Legacy of a Successful Public-Private Partnership", 2007, U.S. Department of Energy, pp. 1-32.
(Continued)

*Primary Examiner* — Vivek K Shirsat
(74) *Attorney, Agent, or Firm* — Robert D. Touslee

(57) ABSTRACT

Submerged combustion burners having a burner body and a burner tip connected thereto. The burner body has an external conduit and first and second internal conduits substantially concentric therewith, forming first and second annuli for passing a cooling fluid therethrough. A burner tip body is connected to the burner body at ends of the external and second internal conduits. The burner tip includes a generally central flow passage for a combustible mixture, the flow passage defined by an inner wall of the burner tip. The burner tip further has an outer wall and a crown connecting the inner and outer walls. The inner and outer walls, and the crown are comprised of same or different materials having greater corrosion and/or fatigue resistance than at least the external burner conduit.

11 Claims, 10 Drawing Sheets

(51) Int. Cl.
*C22C 5/04* (2006.01)
*F23D 14/48* (2006.01)
*C03B 5/167* (2006.01)
*C22C 30/00* (2006.01)
*F23D 14/78* (2006.01)
*C22C 5/02* (2006.01)
*C22C 14/00* (2006.01)
*C22C 19/03* (2006.01)
*F23D 14/04* (2006.01)

(52) U.S. Cl.
CPC ............ *C03B 5/2353* (2013.01); *C22C 5/02* (2013.01); *C22C 5/04* (2013.01); *C22C 14/00* (2013.01); *C22C 19/03* (2013.01); *C22C 30/00* (2013.01); *F23D 14/045* (2013.01); *F23D 14/48* (2013.01); *F23D 14/78* (2013.01); *C03B 2211/23* (2013.01); *C03B 2211/60* (2013.01); *F23D 2214/00* (2013.01); *Y02P 40/55* (2015.11)

(58) Field of Classification Search
USPC .................................... 431/187, 284, 160
See application file for complete search history.

(56) References Cited

U.S. PATENT DOCUMENTS

| | | | |
|---|---|---|---|
| 2,118,479 A | 1/1940 | McCaskey |
| 2,269,459 A | 1/1942 | Kleist |
| 2,321,480 A | 6/1943 | Gaskell |
| 2,432,942 A | 12/1947 | See et al. |
| 2,455,907 A | 1/1948 | Slayter |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,339,616 A | 5/1967 | Ward, Jr. et al. |
| 3,325,298 A | 6/1967 | Brown |
| 3,347,660 A | 10/1967 | Smith et al. |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,568 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,097,028 A | 6/1978 | Langhammer |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenhacher et al. |
| 4,282,023 A | 8/1981 | Hammel et al. |
| 4,303,435 A | 12/1981 | Sleighter |
| 4,323,718 A | 4/1982 | Buhring et al. |
| 4,349,376 A | 9/1982 | Dunn et al. |
| 4,406,683 A | 9/1983 | Demarest |
| 4,413,882 A | 11/1983 | Bailey et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,919,700 A | 4/1990 | Pecoraro et al. |
| 4,927,886 A | 5/1990 | Backderf et al. |
| 4,953,376 A | 9/1990 | Merlone |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A * | 4/1993 | Joshi .................... C03B 5/2353 239/416 |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,266 A | 9/1995 | Snyder et al. |

(56) References Cited

U.S. PATENT DOCUMENTS

| | | |
|---|---|---|
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Watzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A * | 2/2000 | Joshi ............. B05B 7/067 239/404 |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A * | 8/2000 | Richards ............. C03B 5/187 432/120 |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,461 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novick |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,666 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,778,290 B2 | 6/2010 | Sacks et al. |
| 7,748,592 B2 | 7/2010 | Koga et al. |
| 7,767,606 B2 | 8/2010 | McGinnis et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,645,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 9,096,453 B2 | 8/2015 | Charbonneau |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 | 2/2005 | Masi et al. |
| 2005/0039491 A1 | 2/2005 | Maugendre et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2007/0246869 A1 | 10/2007 | Rymarchyk et al. |
| 2008/0035078 A1 | 2/2008 | Li |
| 2008/0227615 A1 | 9/2008 | McGinnis et al. |

(56) References Cited

U.S. PATENT DOCUMENTS

| | | |
|---|---|---|
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0061370 A1* | 3/2009 | Douglas ............... C10J 3/485 431/131 |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0252967 A1* | 10/2010 | Miani ............... C21C 5/5217 266/225 |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2012/0132725 A1 | 5/2012 | Dinu |
| 2012/0122490 A1 | 9/2012 | Cole et al. |
| 2012/0222592 A1* | 9/2012 | Boer ............... C01B 3/363 110/263 |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0137051 A1 | 5/2013 | Beyer et al. |
| 2013/0283861 A1 | 10/2013 | Mobley et al. |

FOREIGN PATENT DOCUMENTS

| | | |
|---|---|---|
| EP | 1 990 321 A1 | 11/2008 |
| GB | 191301772 | 1/1914 |
| GB | 191407633 | 3/1914 |
| GB | 164073 A | 5/1921 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2010147188 A1 | 12/2010 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17, Sep. 30, 2008.

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

* cited by examiner

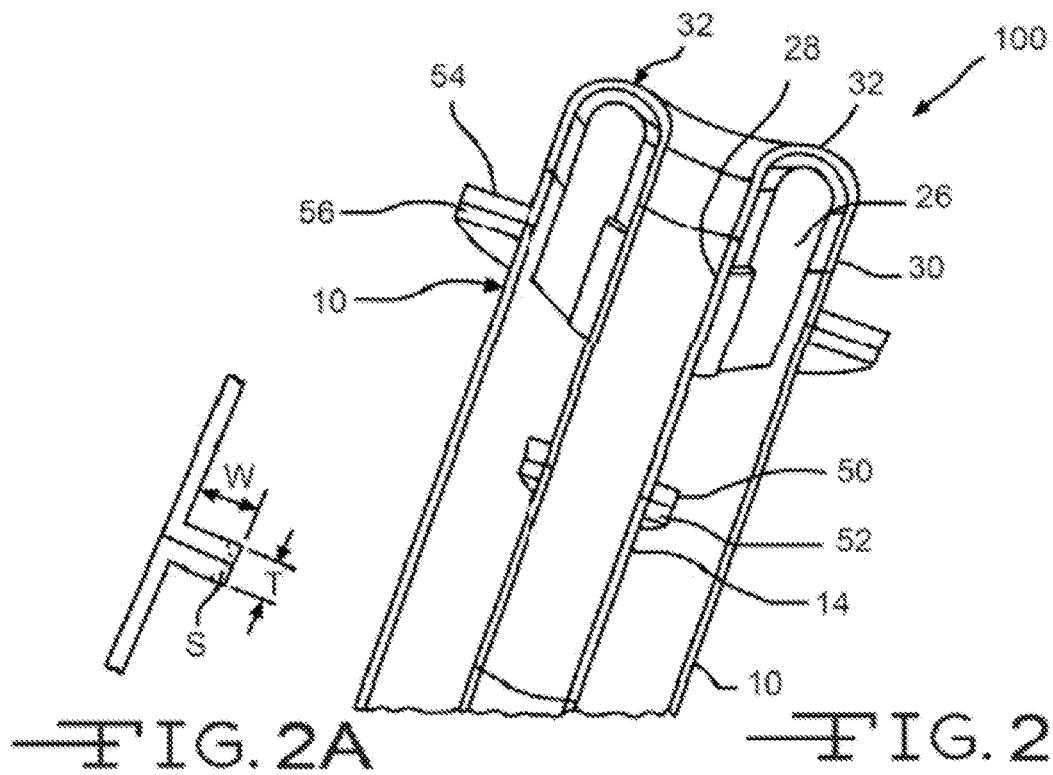
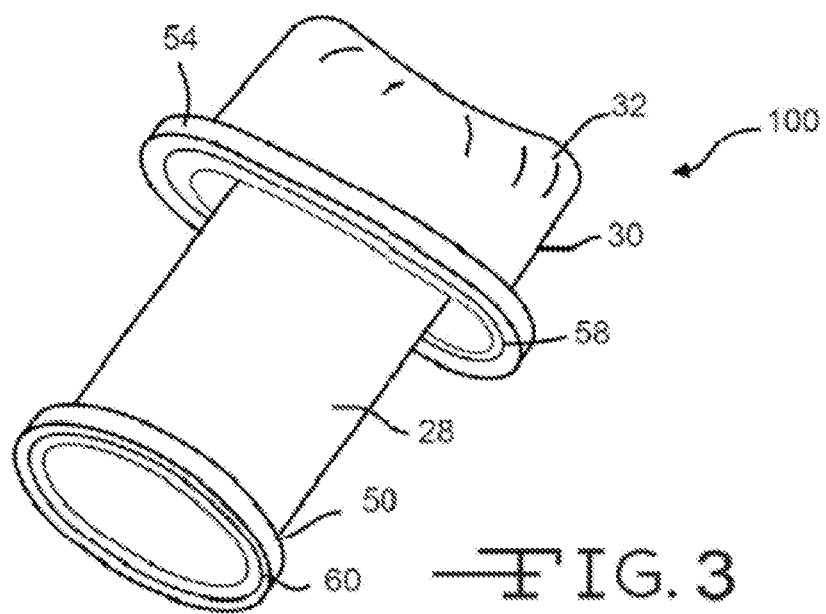

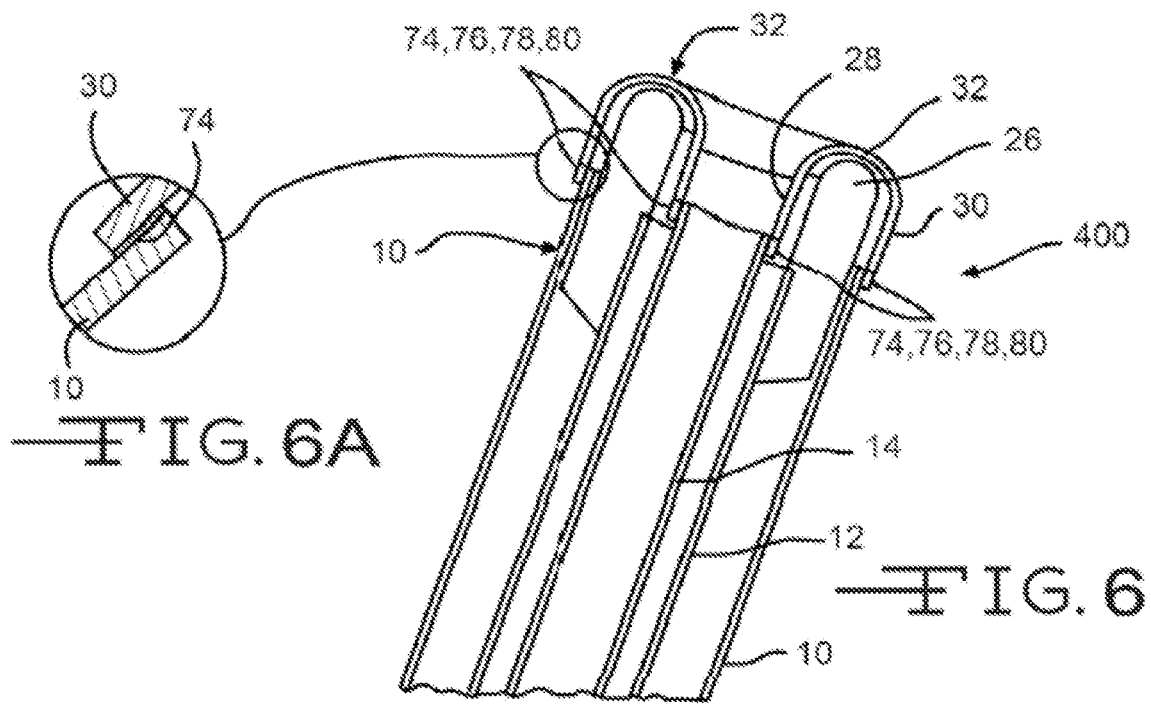
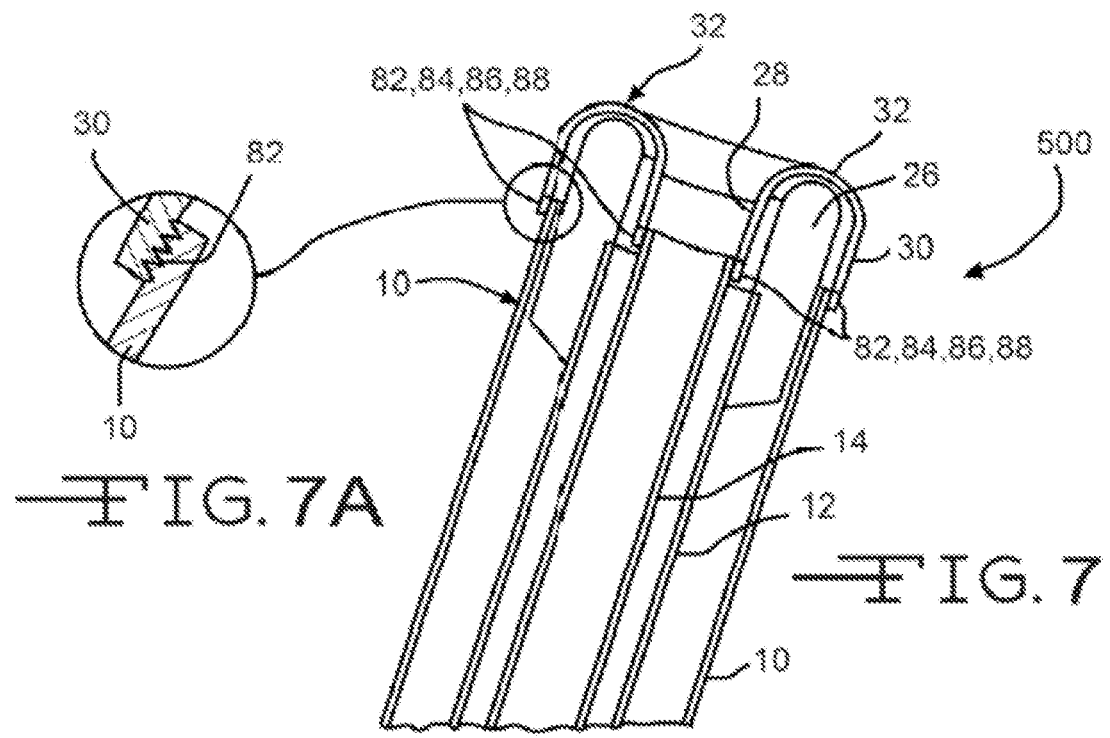

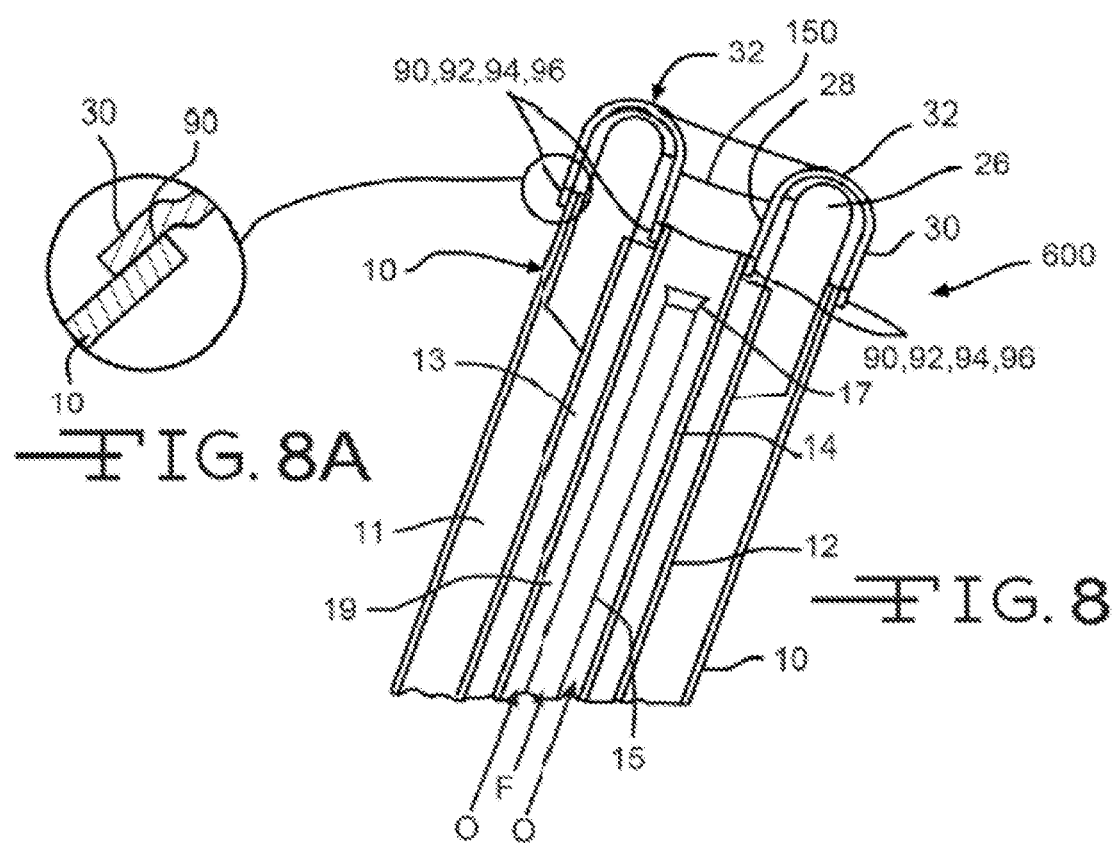

US 10,654,740 B2

SUBMERGED COMBUSTION BURNERS, MELTERS, AND METHODS OF USE

BACKGROUND INFORMATION

Technical Field

The present disclosure relates generally to the field of combustion burners and methods of use, and more specifically to burners, submerged combustion melters, and methods of their use, particularly for melting glass forming materials.

Background Art

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases during submerged combustion (SC), cause rapid melting of the glass batch and much turbulence and foaming.

Oxy-fuel burners have been used for many years in the glass industry in general especially in the fiberglass, TV glass, and container glass industry segments. In the context of SCMs, known oxy-fuel burners are predominately water-cooled, nozzle mix designs and avoid premixing for safety reasons due to the increased reactivity of using oxygen as the oxidant versus air. One currently used submerged combustion burner employs a smooth exterior surface, half-toroid metallic burner tip of the same or similar material as the remainder of the burner. When using such burners in an SCM for the manufacture of glass, the burner tip is placed in an extreme environment. The burner tip is exposed to corrosive combustion gases, high temperature glass contact, internal pressure from water or other coolant, vaporization of coolant within the burner tip, thermal cycling, and the like. As a result, common materials are often insufficient to survive for extended periods of time in this environment.

Development of submerged combustion burners having less susceptibility to the SCM environment while melting glass-forming materials would be an advance in the submerged combustion art.

SUMMARY

In accordance with the present disclosure, submerged combustion (SC) burners, melters including at least one of the submerged combustion burners, and methods of using the melters to produce molten glass are described that may reduce or eliminate problems with known SC burners, melters, and methods.

A first aspect of the disclosure is a fluid-cooled burner comprising:

a burner body comprising an external conduit and a first internal conduit substantially concentric therewith, and positioned internal of the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming a first annulus for passing a cooling fluid there between, and a second internal conduit substantially concentric with, and positioned internal of the first internal conduit, the second internal conduit comprising a first end, a second end, and a longitudinal bore having a longitudinal axis, and configured to form a second annulus between the first and second internal conduits, the burner body comprising fuel and oxidant inlet ports near the second ends of the conduits; and a burner tip defined by an inner wall and an outer wall connected via a crown, the outer wall removably fixed to the first end of the external conduit via an outer connection, and the inner wall removably fixed to the first end of the second internal conduit via an inner connection, the burner tip comprising a generally central flow passage configured to pass a combustible mixture therethrough, the generally central flow passage defined by the inner wall;

wherein the burner tip crown and inner and outer walls comprise the same or different corrosion resistant and fatigue resistant material, at least one of the corrosion and/or fatigue resistance being greater than material comprising the external conduit under conditions experienced during submerged combustion melting of glass-forming materials.

A second aspect of the disclosure is a submerged combustion melter comprising:

a floor, a roof, and a sidewall structure connecting the floor and roof defining an internal space, at least a portion of the internal space comprising a melting zone; and one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone, at least one of the combustion burners being a fluid-cooled combustion burner as described herein.

A third aspect of the disclosure are methods of producing molten glass, comprising:

a) flowing a cooling fluid through first and second annuli in a burner body, the burner body comprising the features described herein, the burner body having a burner tip connected thereto as also described;

b) flowing an oxidant into one or more oxidant inlet ports and through a third annulus defined by the second internal conduit and a central, substantially concentric fuel conduit;

c) flowing a fuel into the one or more fuel inlet ports and through the fuel conduit, the burner body and burner tip configured such that flow of oxidant out of the second annulus and flow of fuel out of the fuel conduit causes the oxidant to intersect flow of the fuel in a mixing region at least partially defined by the generally central flow passage through the burner tip;

d) combusting at least some of the fuel in the mixing region to form a flame and combustion gases; and e) directing the flame and combustion gases into solid and/or partially molten glass forming materials above the mixing region.

A fourth aspect of this disclosure are methods of producing molten glass comprising:

a) flowing a cooling fluid through first and second annuli in a burner body, the burner body comprising the features described herein, the burner body having a burner tip connected thereto as also described;

b) flowing an oxidant into one or more oxidant inlet ports and through a central, substantially concentric oxidant conduit;

c) flowing a fuel into one or more fuel inlet ports and through a third annulus defined by the second inner conduit and the oxidant conduit, the burner body and burner tip body configured such that flow of oxidant out of the oxidant conduit and flow of fuel out of the third annulus causes the oxidant to intersect flow of the fuel in a mixing region at least partially defined by the generally central flow passage through the burner tip;

d) combusting at least some of the fuel in the mixing region to form a flame and combustion gases; and e) directing the flame and combustion gases into solid and/or partially molten glass forming materials above the mixing region.

Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Burners, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 2-11 are schematic longitudinal cross-sectional views of non-limiting embodiments of fluid-cooled portions of various embodiments of SC burners in accordance with the present disclosure;

FIGS. 2A, 6A, 7A, 8A, and 11A are detailed cross-sectional views of various burner features described herein;

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present SC burners employing a metallic burner tip of the same or similar material as the remainder of the burner is that, when using such burners in an SCM for the manufacture of glass, the burner tip is placed in an extreme environment. The burner tip is exposed to corrosive combustion gases, high temperature glass contact, internal pressure from water or other coolant, vaporization of coolant within the burner tip, thermal cycling, and the like. As a result, common materials are often insufficient to survive for extended periods of time in this environment. Therefore, alleviating or reducing the effects of the SCM environment on the burner tip may have significant favorable impact on the life of the burner tip.

Figure 1:
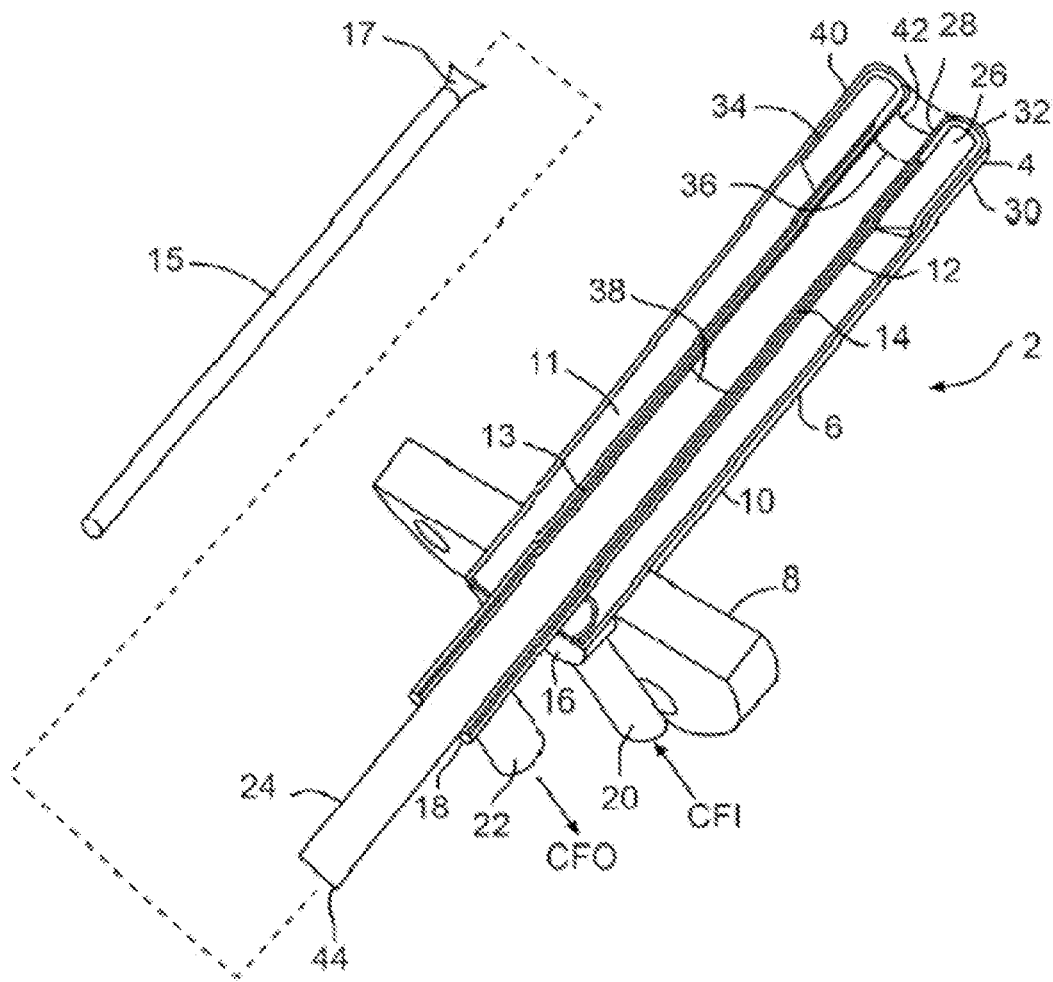
FIG. 1 is a longitudinal cross-section view of fluid-cooled portions of a prior art burner and burner tip, showing typical welded connections between conduits and the burner tip comprising similar mild steel or other base metals, and illustrating a central, substantially concentric fuel or oxidant conduit (not shown in other figures)

FIG. 1 illustrates schematically a prior art SCM burner having a fluid-cooled portion 2 composed of a burner tip 4 attached to a burner body 6. A burner main flange 8 connects the burner to an SCM superstructure, not illustrated. Burner body 6 is comprised of an external conduit 10, a first internal conduit 12, a second internal conduit 14, and end plates 16, 18. A coolant fluid inlet conduit 20 is provided, along with a coolant fluid exit conduit 22, allowing ingress of a cool coolant fluid as indicated by the arrow denoted "CFI", and warmed coolant fluid egress, as indicated by an arrow denoted "CFO", respectively. A first annulus 11 is thus formed between substantially concentric external conduit 10 and first internal conduit 12, and a second annulus 13 is formed between substantially concentric first and second internal conduits 12,14. A proximal end 24 of second internal conduit 14 may be sized to allow insertion of a fuel or oxidant conduit 15 (depending on the burner arrangement), which may or may not include a distal end nozzle 17. When conduit 15 and optional nozzle 17 are inserted internal of second internal conduit 14, a third annulus is formed there between. In certain embodiments, oxidant flows through the third annulus, while one or more fuels flow through conduit 15, entering through a port 44. In certain other embodiments, one or more fuels flow through the third annulus, while oxidant flows through conduit 15, entering through port 44.

Still referring to FIG. 1, fluid-cooled portion 2 of the burner includes a ceramic or other material insert 26 fitted to the distal end of first internal conduit 12. Insert 26 has a shape similar to but smaller than burner tip 4, allowing coolant fluid to pass between burner tip 4 and insert 26, thus cooling burner tip 4. Burner tip 4 includes an inner wall 28, an outer wall 30, and a crown 32 connecting inner wall 28 and outer wall 30. In prior art burners, welds at locations 34 and 36, and optionally at 38, 40 and 42, connect burner tip 4 to external conduit 10 and second internal conduit 14, using conventional weld materials to weld together similar base metal parts, such as carbon steel, stainless steel, or titanium. Despite the use of coolant and even titanium (which ordinarily is considered quite corrosion-resistant), the operating life of burners as illustrated and described in relation to FIG. 1 are very limited in the SCM environment, where temperatures of molten glass may reach 1300° C., and the turbulence of the molten glass caused by the burners themselves as well as combustion gases contribute to form a highly erosive environment in contact with the burner tip.

It has now been discovered that a combination of careful selection of burner tip material and type of connections between the burner tip walls and conduits forming the burner body may significantly increase the operating life of SC burners used to melt glass-forming materials in an SCM. This disclosure in particular describes use of corrosion-resistant and/or fatigue resistant materials for the burner tip components connected to a dissimilar (and in certain embodiments, lower cost) material as the burner body, and methods of attachment. More particularly, at least one of the corrosion and/or fatigue resistance of the outer wall of the burner tip is greater than material comprising the external conduit under conditions experienced during submerged combustion melting of glass-forming materials.

Various terms are used throughout this disclosure. "Submerged" as used herein means that combustion gases emanate from combustion burners under the level of the molten glass; the burners may be floor-mounted, wall-mounted, or in melter embodiments comprising more than one submerged combustion burner, any combination thereof (for example, two floor mounted burners and one wall mounted burner). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Burner tips may comprise noble metals or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. In certain embodiments the burner tip may comprise a platinum/rhodium alloy attached to the base metals comprising the burner body using a variety of techniques, such as brazing, flanged fittings, interference fittings, friction welding, threaded fittings, and the like, as further described herein with regard to specific embodiments. Threaded connections may eliminate the need for 3$^{rd}$ party forgings and expensive welding or brazing processes—considerably improving system delivery time and overall cost. It will be understood, however, that the use of 3$^{rd}$ party forgings, welding, and brazing are not ruled out for burners described herein, and may actually be preferable in certain situations.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of glass melt to be produced. The skilled artisan, having knowledge of the particular application, pressures, temperatures, and available materials, will be able design the most cost effective, safe, and operable burners for each particular application without undue experimentation.

The terms "corrosion resistant" and "fatigue resistant" as used herein refer to two different failure mechanisms that may occur simultaneously, and it is theorized that these failure mechanisms may actually influence each other in profound ways such that a new term may be coined to describe their dual influence, denoted "cortigue", or "cortigue resistance", and refers to a burner tip material that will have a satisfactory service life of at least 12 months under conditions existing in a continuously operating SCM adjacent to the burner tip. As used herein the SCM may comprise a floor, a roof, and a sidewall structure connecting the floor and roof defining an internal space, at least a portion of the internal space comprising a melting zone, and one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone.

In certain embodiments the crown of the burner tip may include at least one physical convolution sufficient to increase surface area and fatigue resistance of the crown compared to a smooth, half-toroid crown of the same composition, as disclosed in Applicant's co-pending U.S. Patent App. No. US2016/0075587A1, published Mar. 17, 2016.

Certain embodiments may comprise a burner tip insert shaped substantially the same as but smaller than the burner tip and positioned in an internal space defined by the burner tip, the insert configured so that a cooling fluid may pass between internal surfaces of the burner tip and an external surface of the insert. In these embodiments a first or distal end of the first internal conduit would be attached to the insert.

In certain embodiments, the inner and outer walls of the burner tip body may extend beyond the first end of the first internal conduit, at least partially defining a mixing region for oxidant and fuel. In certain embodiments the burner tip inner wall may be a right cylindrical inner wall, and the outer wall may be a right cylindrical outer wall, the right cylindrical inner and outer walls connected via a curvilinear crown. In certain embodiments the right cylindrical outer wall may be removably fixed to the first end of the external conduit via an outer connection, and the right cylindrical inner wall may be removably fixed to the first end of the second internal conduit via an inner connection. The burner tip may comprise a generally central flow passage configured to pass a combustible mixture therethrough, the generally central flow passage defined by the right cylindrical inner wall. In certain embodiments, the burner tip crown and right cylindrical inner and outer walls may comprise the same or different corrosion resistant and fatigue resistant material, at least one of the corrosion and/or fatigue resistance being greater than material comprising the external conduit under conditions experienced during submerged combustion melting of glass-forming materials. In certain embodiments the burner body and burner tip may be configured with the first end of the central, concentric conduit recessed from the curvilinear crown such that flow of oxidant or fuel out of the third annulus and flow of fuel or oxidant out of the central, concentric conduit causes the fuel and oxidant to intersect and mix sufficiently in a mixing region (150) to combust at least some of the fuel in the mixing region (150) and to form the combustible mixture and a flame in the mixing region (150) in the generally central flow passage defined by the right cylindrical inner wall (28) and a portion of the curvilinear crown (32) downstream of the right cylindrical inner wall (28).

Conduits of burner bodies and associated components (such as spacers and supports between conduits, but not burner tips) used in SC burners, SCMs and processes of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the burners.

Suitable materials for the glass-contact refractory, which may be present in SC melters and downstream flow channels, and refractory burner blocks (if used), include fused zirconia ($ZrO_2$), fused cast AZS (alumina-zirconia-silica), rebonded AZS, or fused cast alumina ($Al_2O_3$). The melter geometry and operating temperature, burner and burner tip geometry, and type of glass to be produced, may dictate the choice of a particular material, among other parameters.

The term "fluid-cooled" means use of a coolant fluid (heat transfer fluid) to transfer heat away from the burner exterior conduit and burner tip. Heat transfer fluids may be any gaseous, liquid, or some combination of gaseous and liquid compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more burners in the SCM and/or flow channel(s) downstream thereof may be adjustable with respect to direction of flow of the combustion products. Adjustment may be via automatic, semi-automatic, or manual control. Certain system embodiments may comprise a burner mount that mounts the burner in the wall structure, roof, or floor of the SCM and/or flow channel comprising a refractory, or refractory-lined ball joint. Other burner mounts may comprise rails mounted in slots in the wall or roof. In yet other embodiments the burners may be mounted outside of the melter or channel, on supports that allow adjustment of the combustion products flow direction. Useable supports include those comprising ball joints, cradles, rails, and the like.

Certain SCMs and/or flow channels may employ one or more high momentum, non-submerged burners, for example, to impinge on portions of a foam layer. High momentum burners useful in apparatus, systems, and methods of this disclosure include those disclosed in Applicant's co-pending U.S. patent application Ser. No. 13/268,130, filed Oct. 7, 2011, now U.S. Pat. No. 9,021,838, issued May 5, 2015. As used herein the phrase "high momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Certain SCMs and method embodiments of this disclosure may include fluid-cooled panels such as disclosed in Applicant's co-pending U.S. patent application Ser. No. 12/817,754, filed Jun. 17, 2010, now U.S. Pat. No. 8,769, 992, issued Jul. 8, 2014. In certain system and process embodiments, the SCM may include one or more adjustable flame submerged combustion burners comprising one or more oxy-fuel combustion burners, such as described in Applicant's co-pending U.S. patent application Ser. No. 13/268,028, filed Oct. 7, 2011, now U.S. Pat. No. 8,875,544, issued Nov. 4, 2014. In certain systems and processes, the SCM may comprise a melter exit structure designed to minimize impact of mechanical energy, such as described is Applicant's co-pending U.S. patent application Ser. No. 13/458,211, filed Apr. 27, 2012, now U.S. Pat. No. 9,145, 319, issued Sep. 29, 2015. In certain systems and processes, the flow channel may comprise a series of sections, and may comprise one or more skimmers and/or impingement (high momentum) burners, such as described in Applicant's co-pending U.S. patent application Ser. No. 13/268,130, filed Oct. 7, 2011, now U.S. Pat. No. 9,021,838, issued May 5, 2015, and Ser. No. 13/493,170, filed Jun. 11, 2012, now U.S. Pat. No. 8,707,739, issued Apr. 29, 2014. Certain systems and processes of the present disclosure may utilize measurement and control schemes such as described in Applicant's co-pending U.S. patent application Ser. No. 13/493,219, filed Jun. 11, 2012, now U.S. Pat. No. 9,096,453, issued Aug. 4, 2015, and/or feed batch densification systems and methods as described in Applicant's co-pending U.S. patent application Ser. No. 13/540,704, filed Jul. 3, 2012, now U.S. Pat. No. 9,643,869, issued May 9, 2017. Certain SCMs and processes of the present disclosure may utilize devices for delivery of treating compositions such as disclosed in Applicant's co-pending U.S. patent application Ser. No. 13/633, 998, filed Oct. 3, 2012 now U.S. Pat. No. 8,973,405 issued Mar. 10, 2015.

Certain SCMs and process embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain SCMs and processes of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, composition of bubbles and/or foam, and combinations thereof, and may employ a control algorithm to control combustion temperature, treatment composition flow rate or composition, based on one or more of these input parameters.

In certain embodiments of the present disclosure, burner tip 4 may be joined to burner body 6 using flanges. When joined in this way, critical design features are the thickness of the flange, the width of the flange, and the shape of the area surrounding the junction as this location is typically cooled with a coolant fluid and pressure drop needs to be minimized. In addition, when using flanges, careful selection of gasket material is necessary to ensure sealing and the ability to expose the flange to an oxygen or oxygen-enriched environment. In addition, or in certain alternative embodiments, plastically deformable features may be positioned on one or more of the flange faces to enable joint sealing.

In other embodiments, brazing compounds and methods may be used to attach burner tip 4 to burner body 6. Brazing allows the joining of dissimilar metals and also allows for repairs to be made by removing the braze material. For these embodiments to be successful, the mating surfaces must be parallel or substantially so, and of sufficient overlap to ensure that the brazing material can properly flow between the portions of the burner tip and burner body being joined. This may be achieved in certain embodiments using a flange at right angles to both the burner tip walls 28, 30, and the conduits forming burner body 6. In other embodiments brazing may be successfully achieved by making the burner tip walls 28, 30 and conduits 14, 10 overlap with sufficient gaps to allow brazing material to enter the gaps.

Braze compounds, sometimes referred to as braze alloys, to be useful in embodiments of the present disclosure, must have liquidus and solidus temperatures above the highest temperature of the burner tip. The highest temperature of the burner tip will be a temperature equal to the melt temperature existing in the SCM reduced by the flow of coolant through the burner tip, as well as by the flow of combustion gases through the burner tip. The highest temperature of the burner tip during normal operating conditions depends on the type of glass being made, which makes the selection of braze alloy not a simple matter. For Na—Ca—Si soda-lime window glass (Glass 1), typical melt temperature may range from about 1275° C. to about 1330° C.; for Al—Ca—Si E glass having low sodium and zero boron (Glass 2), the melt temperature may range from about 1395° C. to about 1450° C.; for B—Al—Si glass, zero sodium, zero potassium, high Si (Glass 3), the melt temperature may be about 1625° C.; and for B—Al—Ca—Si E glass used for reinforcement fiber (Glass 4), the melt temperature maybe about 1385° C. This information was taken from Rue, D., "*Energy Efficient Glass Melting—The Next Generation Melter*", p. 63, GTI Project Number 20621, March, 2008 (U.S. Dept. of Energy). Based on these temperatures, and assuming a drop in burner tip temperature of 300° C. due to coolant and gas flow through the burner tip, Table 1 lists the possible braze alloys that may be used.

TABLE 1

| | Braze Alloys | | |
|---|---|---|---|
| Glass Type | Glass Melt T, (° C.) | Possible Braze Alloys[1] | Solidus T, (° C.)[2] |
| 1 | 1275-1330 | Pt | 1769 |
| | | Pd | 1555 |
| | | Ti | 1670 |
| | | Au/Pd (92/8, PALORO | 1200 |

TABLE 1-continued

Braze Alloys

| Glass Type | Glass Melt T, (° C.) | Possible Braze Alloys[1] | Solidus T, (° C.)[2] |
|---|---|---|---|
| | | (BAU-8)) | |
| | | Ni/Pd (40/60, PALNI) | 1238 |
| | | Pd/Co (65/35, PALCO BPD-1) | 1219 |
| | | Pd/Ni/Au (34/36/30, PALNIRO 4 (AMS-4785)) | 1135 |
| | | Cu | 1083 |
| | | Au | 1064 |
| 2 | 1395-1450 | Pt | 1769 |
| | | Pd | 1555 |
| | | Ti | 1670 |
| | | Au/Pd (92/8, PALORO (BAU-8)) | 1200 |
| | | Ni/Pd (40/60, PALNI) | 1238 |
| | | Pd/Co (65/35, PALCO BPD-1) | 1219 |
| 3 | 1625 | Pt | 1769 |
| | | Ti | 1670 |
| 4 | 1385 | Pt | 1769 |
| | | Pd | 1555 |
| | | Ti | 1670 |
| | | Au/Pd (92/8, PALORO (BAU-8)) | 1200 |
| | | Ni/Pd (40/60, PALNI) | 1238 |
| | | Pd/Co (65/35, PALCO BPD-1) | 1219 |
| | | Pd/Ni/Au (34/36/30 PALNIRO 4 (AMS-4785)) | 1135 |

[1]PALORO, PALNI, and PALNIRO are registered trademarks, and PALCO is a trademark of Morgan Technical Ceramics and/or Morgan Advanced Ceramics, Inc.
[2]From Internet website of Morgan Technical Ceramics and The Morgan Crucible Company plc, England In yet other embodiments, burner tip walls and conduit 14, 10 may be threaded together, in certain embodiments accompanied by a sealant surface of flange upon which sealants, gaskets or O-rings may be present. Threaded joints may be straight or tapered such as NPT. In certain threaded embodiments the sealing surfaces of burner tip walls 28, 30 may be malleable enough compared to conduits 14, 10 to deform and form their own seals, without sealants, gaskets, or O-rings.

In still other embodiments, burner tip walls 28, 30 may be interference or "press" fit to their respective conduit 14, 10 of burner body 6. In these embodiments, the walls and/or conduits are machined to sufficiently close tolerances to enable deformation of one or both surfaces as the two parts are forcefully joined together.

In yet other embodiments, burner tip walls 28, 30 may be friction welded together. In these embodiments, either the burner tip walls or burner body conduits, or both, may be spun and forced into contact until sufficient temperature is generated by friction to melt a portion of either or both materials, welding walls 28, 30 to conduits 14, 10, respectively. These embodiments may include one or more additional metals serving as an intermediate between walls 28, 30 and conduits 14, 10 to facilitate friction welding.

Specific non-limiting burner, burner tip, SCM and process embodiments in accordance with the present disclosure will now be presented in conjunction with FIGS. 1-11. The same or similar numerals are used for the same or similar features in the various figures. In the views illustrated in FIGS. 1-8, it will be understood in each case that the figures are schematic in nature, and certain conventional features are not illustrated in order to illustrate more clearly the key features of each embodiment.

Figure 4:
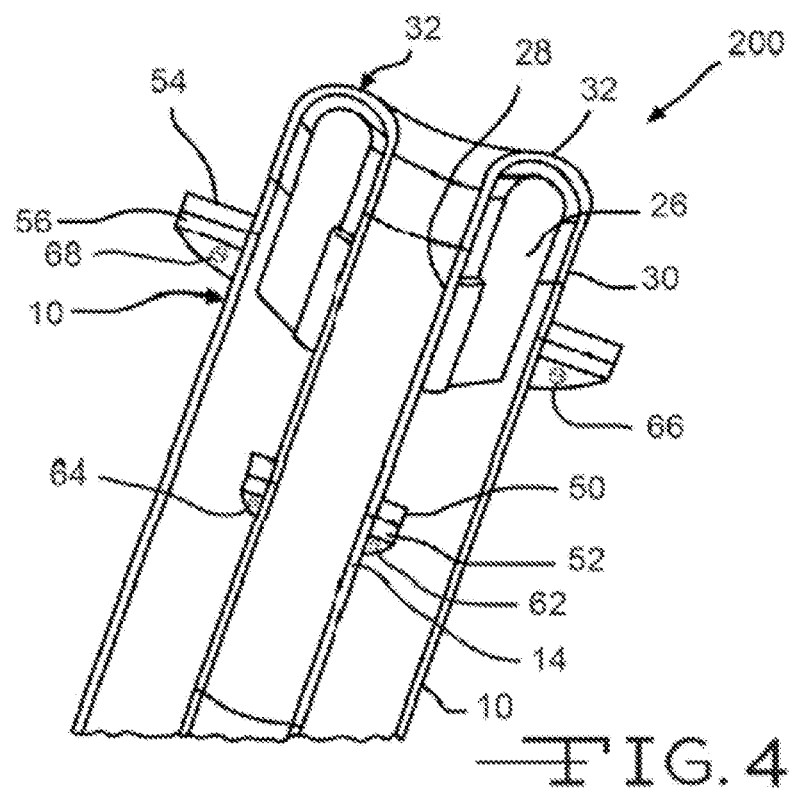

Referring now again to the figures, FIGS. 2-11 are schematic longitudinal cross-sectional views of non-limiting embodiments of fluid-cooled portions of various embodiments of SC burners in accordance with the present disclosure, while FIGS. 2A, 6A, 7A, 8A, and 11A are detailed cross-sectional views of various burner features described herein. Embodiment 100 illustrated schematically in FIG. 2 includes a Pt/Rh or other corrosion and fatigue resistant inner flange portion 50 mated with a base metal inner flange portion 52. Flange portions 50, 52 serve to connect inner wall 28 of the burner tip to second internal conduit 14. Also illustrated are Pt/Rh or other corrosion and fatigue resistant outer flange portion 54 mated with a base metal outer flange portion 56. Flange portions 54, 56 serve to connect outer wall 30 of the burner tip to external conduit 10. Bolting is not illustrated for clarity, but it is understood that flange portions 50, 52 are bolted together, as are flange portions 54, 56. Bolting may be of the threaded-bolt-and-nut type, or simply a threaded bolt that passes completely through one flange portion and partially or completely through the mating flange portion. Bolting of the latter type is illustrated schematically in embodiment 200 of FIG. 4, illustrating bolts 62, 64, 66, and 68.

The dimensions of thickness "T" and width "W" of the flange connection formed by flange portions 50, 52 are illustrated schematically in FIG. 2A, as well as a shape feature, "S", in dashed lines, indicating that flange portion 50, 52 may have some other shape to minimize pressure drop of coolant fluid through the first and second annuli, discussed herein. Note that "W" must be a value that allows a gap between the flange formed by flange portions 50, 52 and the first internal conduit 12 depicted in FIG. 1 (not shown in FIG. 2) to allow warmed coolant fluid to flow out of the fluid-cooled portion of the burner. Depending on the inner diameter of first internal conduit 12 in the location of flange portions 50, 52, "W" may range from 1 or more centimeters, in certain embodiments up to 30 centimeters or more. "T" may range from about 1 to about 10 centimeters, or from about 1 to about 5 centimeters. "S" may be rounded, ovoid, or angled, chamfered, beveled, and the like.

FIG. 3 is a perspective view of the burner tip of embodiment 100, illustrating schematically the inclusion of deformable features 58, 60 on the faces of flange portions 50, 54. In the embodiment illustrated in FIG. 3, deformable features 58, 60 are raised linear areas of Pt/Rh or other corrosion/fatigue resistant material, but the format of the deformable areas may be any format that will deform the areas to form a seal, such as a plurality of discrete circular areas ("dots"), or dashed areas. Another embodiment, not illustrated, is to provide machined or molded non-deformable areas or regions on the mating faces of base metal flange portions 52, 56 (FIG. 2) and allow these non-deformable features to deform mating regions of corrosion/fatigue resistant flange portions 50, 54, it being understood that the hardness and/or ductility of the base metal are generally greater than the hardness and/or ductility of the corrosion/fatigue resistant material of the burner tip.

Careful selection of gasket material is a feature of embodiment 200 illustrated in FIG. 4, which does not employ deformable features in the flange faces. In these embodiments, the gasket material used is resistant to oxygen attack, the required resistance level being greater as the percentage of oxygen in the oxidant stream increases. Suitable metallic gasket materials depend on the temperature, oxygen concentration, and expected life, but may include INCONEL (an alloy comprising 77 percent Ni, 15 percent Cr and 7 percent Fe) and titanium. Silica fabrics and silica tapes, such as those known under the trade designation MAXSIL (McAllister Mills, Inc., Independence, Va.), may be used.

Figure 5:
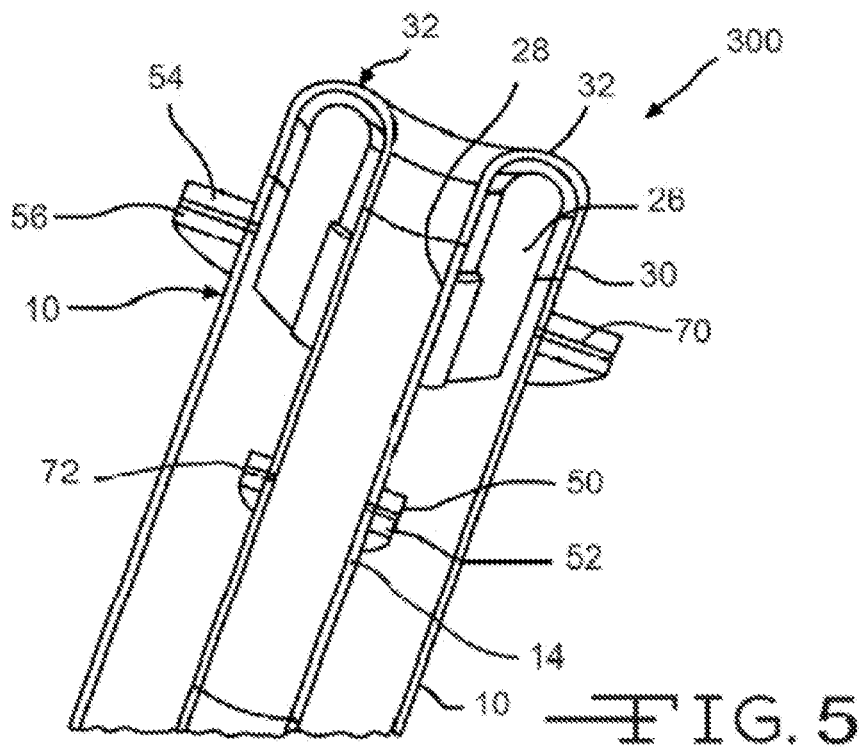

FIG. 5 illustrates schematically embodiment 300 employing the same or different braze materials 70 and 72 between flange portions 54, 56 and 50, 52, respectively. The braze materials may be independently selected from any metallic braze materials having a solidus temperature at least 10° C., preferably at least 20° C. greater than the burner tip temperature, cooled by flowing coolant and flowing combustion gases, oxidant and/or fuel. Some non-limiting examples are provided in Table 1 herein. In certain embodiments it may not be necessary that the braze material fill the entire width "W" of the flange joint or joints, however, those embodiments having 100 percent fill are exemplary embodiments.

FIG. 6 illustrates schematically embodiment 400, an alternative wherein the same or different braze materials 74, 76, 78, and 80 are used in joints that are substantially parallel to the conduits of the burner and walls of the burner tip. Braze materials 74, 76, 78, and 80 may be independently selected from any metallic braze materials having a solidus temperature at least 10° C., preferably at least 20° C. greater than the burner tip temperature, cooled by flowing coolant and flowing combustion gases, oxidant and/or fuel. Some non-limiting examples are provided in Table 1 herein. In certain embodiments it may not be necessary that the braze material fill the entire overlapping area of the joined parts, however, those embodiments having 100 percent fill of the overlapping areas are exemplary embodiments. A more detailed view of the braze area 74 is illustrated schematically in FIG. 6A. In these embodiments, the corrosion/fatigue resistant material of burner tip walls 28, 30 do not deform substantially, although they may deform slightly.

FIG. 7 illustrates schematically embodiment 500, an alternative wherein the same or different threaded joints 82, 84, 86, and 88 may be present. FIG. 7A illustrates a detailed view of threaded joint 82, a straight thread. Tapered threads may also be employed. As mentioned herein, threaded joint may utilize sealants, gaskets, O-rings, and the like, or may simply utilize deformable threads. Certain threaded embodiments may use a combination of two or more of these sealing techniques.

FIG. 8 illustrates yet another embodiment 600, embodiment 600 featuring interference fittings 90, 92, 94, and 96 between inner and outer walls 28, 30 of the corrosion/fatigue resistant burner tip, and conduits 10 and 14 of the base material burner body. FIG. 8A is a detailed schematic illustration of interference fit joint 90, illustrating in a slightly exaggerated manner the deformation of out wall 30.

Figure 9:
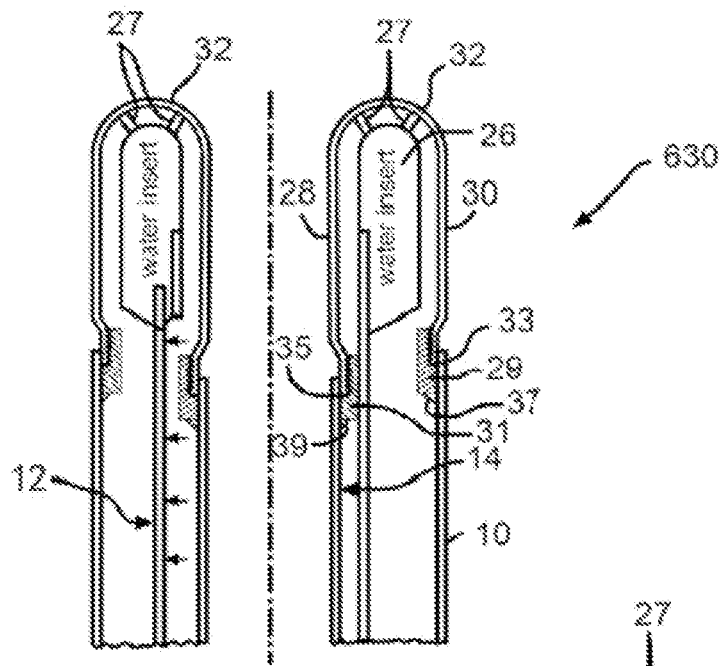

FIG. 9 illustrates schematically yet another embodiment 630, featuring inner and outer threaded rings 29, 31, O-rings 33, 35, and weld, solder, or braze areas 37, 39. Arrows on the left portion of FIG. 9 illustrated schematically repositioning of conduit 12 so that insert 26 will fit between threaded rings 29, 31 upon assembly and disassembly. Two positioning pins 27 are illustrated (more or less than two may be used), which function to maintain a gap between insert 26 and crown 32 for coolant flow. In embodiment 630, burner tip inner and outer walls 28, 30, and crown 32 may be a single noble metal piece, or may be separate pieces welded, soldered, or brazed together. Issues of possible crossthreading of noble metal threads of inner and outer walls 28, 30 of the burner tip to noble metal or non-noble metal threads of rings 29, 31 may disfavor this design, as well as the need to reposition conduit 12. In one variation, threads may instead be press-fit locking dog connections.

Figure 10:
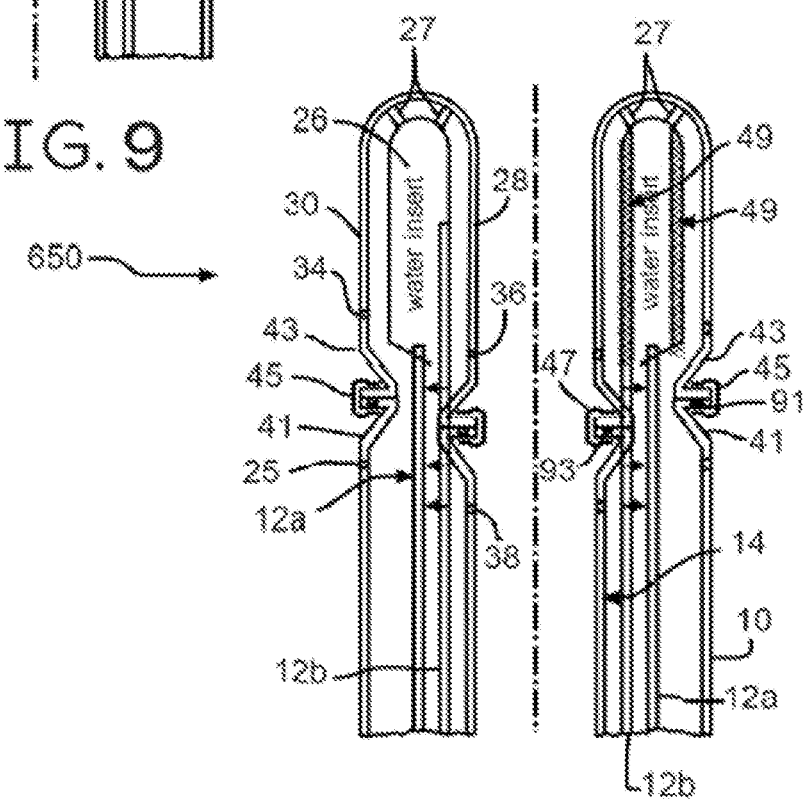

FIG. 10 illustrates schematically yet another embodiment 650 featuring lower and upper flange connectors 41, 43, which may be fastened together using one or more clips 45. O-rings, gaskets, or other seals 91, 93, with or without one or more grooves in flange faces, may be used if necessary. Lower flange connector 41 may be welded, soldered, or brazed to conduit 10 at 25, and to conduit 14 at 38. Upper flange connector 43 may be welded, soldered, or brazed to burner tip outer wall 30 at weld or braze area 34, and to burner tip inner wall 28 at weld or braze area 36. As with embodiment 630, embodiment 650 may be disfavored due to the need to reposition conduit 12 as illustrated by arrows (12a indicates possible new position, and 12b original position), and possible need to remove portions of insert 26, as indicated at 49, so that insert 26 will fit between flanged areas during assembly and disassembly.

Figure 11:
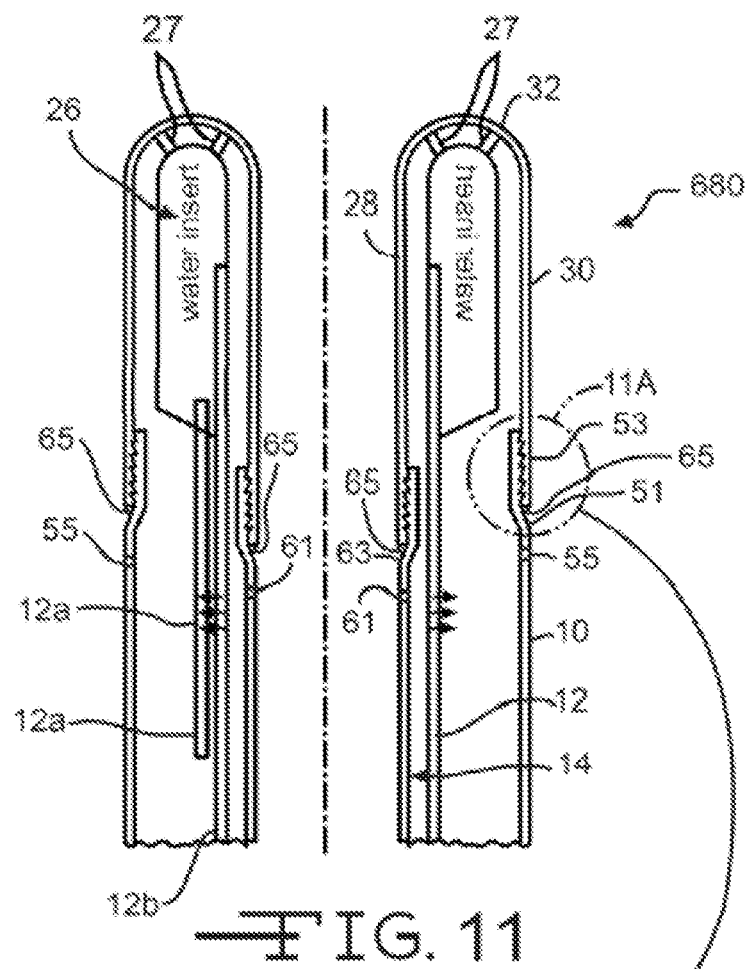
Figure 11A:
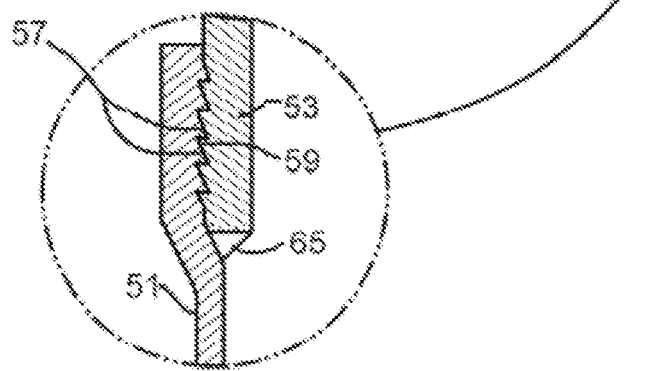

FIG. 11 illustrates schematically yet another embodiment 680 featuring locking dog or other type of shaped connectors 57, 59 (such as ribs, knurls, scallops, and the like) used to connect a lower area 53 of burner tip outer wall 30 to a shaped "grip ring" 51 as perhaps more evident in the detail of FIG. 11A. This type of connection, or a different type, may be used to connect a lower area of burner tip inner wall 28 to another shaped grip ring 63. Shaped grip ring 51 may be welded, soldered, or brazed to conduit 10 at area 55, and shaped grip ring 63 may be welded, soldered, or brazed to conduit 14 at area 61. To effect coolant seals, areas 65 maybe welded, soldered, or brazed using appropriate materials for the service and conduit materials. As with embodiments 630, 650, embodiment 680 may require a slight repositioning of conduit 12 as illustrated by arrows (12a indicates possible new position, and 12b original position), however there should be less need to remove portions of insert 26 so that insert 26 will fit between flanged areas during assembly and disassembly, as insert 26 and conduit 12 need only clear grip rings 51, 63. Burner tip walls 28, 30, and crown 32 may comprise noble metal. Grip rings 51, 63 may each comprise a base metal with noble metal rolled thereon to form shaped connectors 57.

Those of skill in the art will appreciate that embodiments within the present disclosure may include a combination of the joining methods described herein, for example, in embodiment 300 illustrated schematically in FIG. 5, braze material 72 may be replaced with deformable features forming a seal, as described in relation to embodiment 100 illustrated schematically in FIGS. 2-3. Another embodiment may include, for example, interference fittings 92, 94 between second internal conduit 14 and inner wall 28 as illustrated schematically in FIG. 8, and brazed joints 74, 80, as illustrated schematically in FIG. 6. Yet other embodiments may include flange joints formed by flange portions 50, 52 and interference fittings 90, 96. Other various combinations of the techniques of joining burner tips and burner bodies of dissimilar metals disclosed herein are deemed within the present disclosure.

Those of skill in the art will also appreciate that outside of the burners described herein the warmed heat transfer fluid would be cooled so that it may be reused. As may also be appreciated, burner embodiments described herein define a mixing region 150 (FIG. 8) where fuel "F" and oxidant "O" mix, the mixing region 150 being partially formed by the through passage through burner tip, defined by burner tip inner wall 28. In certain embodiments, fuel emanates from the distal end of central conduit 15 (FIG. 1), and oxidant traverses through a third annulus 19 between central conduit 15 and second internal conduit 14, however, as mentioned herein, these flows could be changed so that fuel traverses third annulus 19 and oxidant traverses through central conduit 15.

The thickness of crown 32 and inner and outer walls 28, 30 in the various embodiments illustrated herein is not critical, and need not be the same for every region of the crown and walls. Suitable thicknesses may range from about 0.1 cm to about 1 cm, or larger. It is theorized there may be a balance between corrosion and fatigue resistance, and thickness, with the thickness requirement generally being increased if the "cortigue" resistance of the crown and/or wall material is reduced. Thicker crowns and walls, or thicker regions of crowns and walls, will generally be stronger and exhibit more fatigue resistance, but may be more difficult to install, for example if deformable interference fittings are to be employed.

Figure 12:
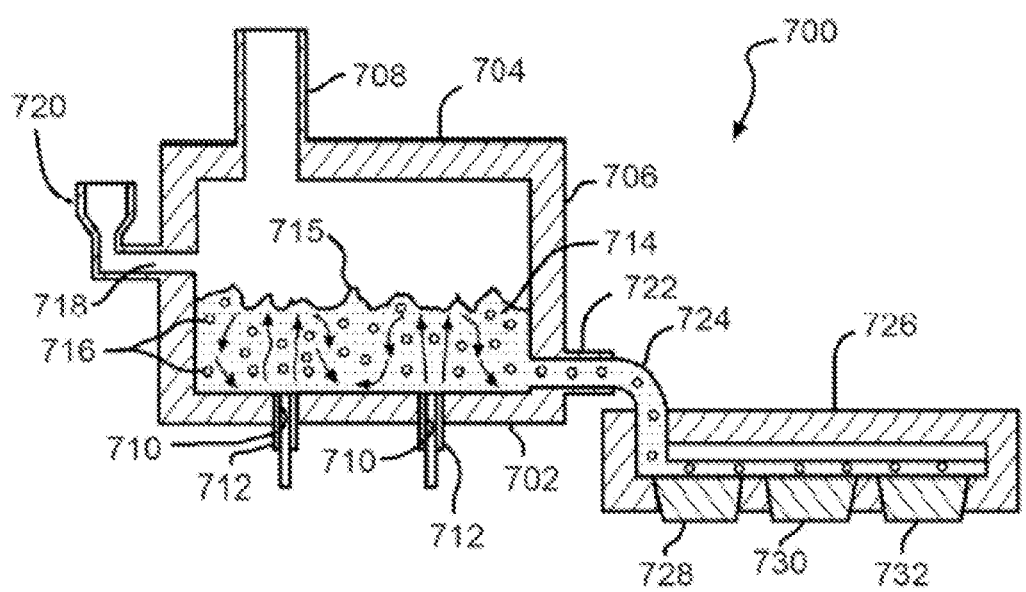
FIG. 12 is a schematic cross-sectional view of an SCM in accordance with the present disclosure.

FIG. 12 illustrates system embodiment 700 comprising an SCM having a floor 702, a roof or ceiling 704, a wall 706 having a feed opening 718, and a feeder 720 for feeding batch, cullet, waste material, or combination thereof. System embodiment 700 further includes an exhaust stack 708, and openings 710 for two (or more, not illustrated) floor-mounted and/or sidewall-mounted submerged combustion burners 712, which create during operation a highly turbulent melt indicated at 714, with a turbulent surface 715. In certain embodiments, floor-mounted burners 712 may be positioned to emit combustion products into molten glass in the melting zone 714 in a fashion so that the gases penetrate the melt generally perpendicularly to floor 702. In other embodiments, one or more floor-mounted burners 712 may emit combustion products into the melt at an angle to floor 702, where the angle may be more or less than 45 degrees, but in certain embodiments may be 30 degrees, or 40 degrees, or 50 degrees, or 60 degrees, or 70 degrees, or 80 degrees. Burners 712 may be air-fuel burners or oxy-fuel burners, or some combination thereof, as further described herein. Embodiment 700 further includes a melter exit structure 722 for discharging the molten glass or similar material 724 including a plurality of gaseous bubbles 716 directly into a forehearth 726. Melter exit structure 722 is positioned generally downstream of melter turbulent zone 714 as illustrated of FIG. 12, and may or may not be mechanically connected to forehearth 726. No molten glass-conditioning channel is included between melter exit structure 722 and forehearth 726 in embodiment 700, but this may not be true in all embodiments, as embodiment 700 is configured to manufactured foamed glassed articles. Completing system 700 are one or more bushings on a lower portion of forehearth 726, system 700 having three bushings 728, 730, and 732, for producing hollow fibers, or fibers having regions substantially devoid of glass. Other glass forming operations may be fed by the SCM, this being merely an example arrangement.

Certain burner embodiments may include an adjustable, changeable and removable structure or insert 17 of central conduit 15 (FIGS. 1 and 8), such as described in assignee's co-pending application Ser. No. 13/268,028, filed Oct. 7, 2011, now U.S. Pat. No. 8,875,544 issued Nov. 4, 2014. As used herein the word "changeable", when referring to a burner feature, means that that feature may be physically different from burner to burner by machining or molding, for example, while the term "adjustable" means that a feature of a burner may actually be varied without making physical modifications to the burner. Such adjustable, changeable and removable structures or inserts include a body that is adjustable in the sense that threads or other connectors allow variation of the axial position of the insert. Furthermore, physical parameters of such inserts may be changed, and the entire insert may be removed and replaced with another insert of same or different dimensions if desired.

Figure 13:
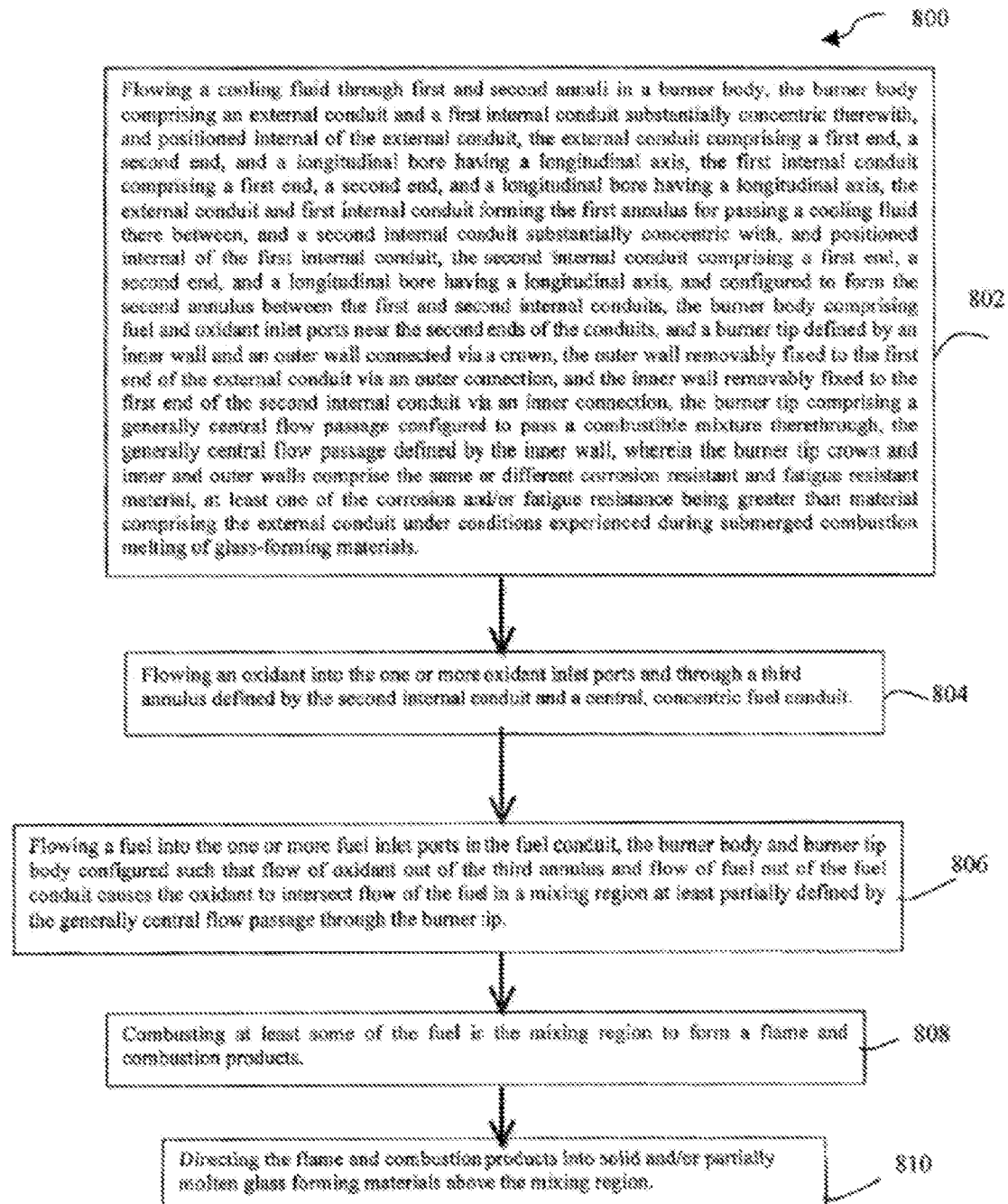
FIGS. 13 and 14 are logic diagrams of two methods in accordance with the present disclosure.
Figure 14:
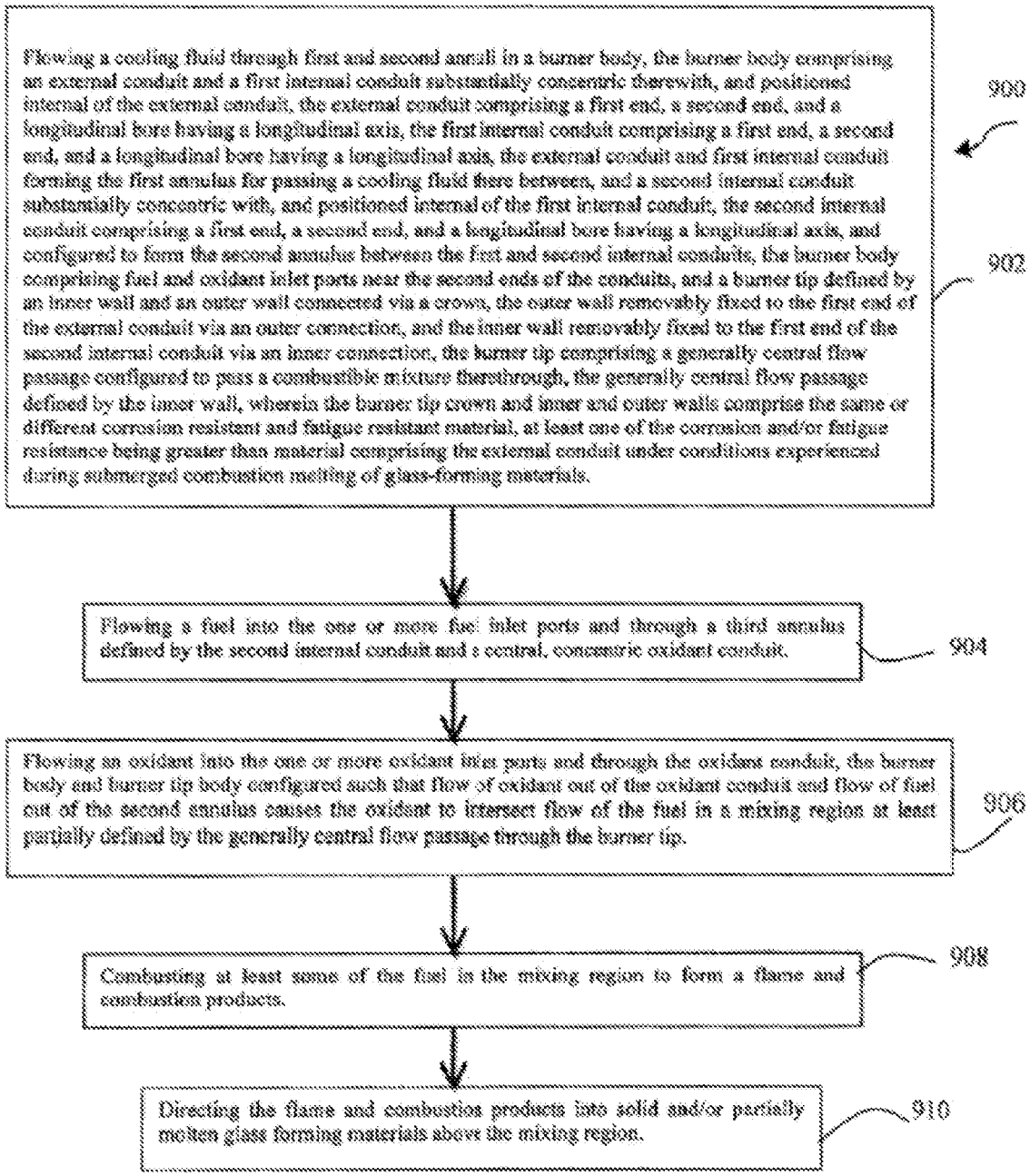

FIGS. 13 and 14 are logic diagrams of two methods in accordance with the present disclosure. Method embodiment 800 of FIG. 13 comprises (box 802) flowing a cooling fluid through first and second annuli in a burner body, the burner body comprising an external conduit and a first internal conduit substantially concentric with, and positioned internal of the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming the first annulus for passing a cooling fluid there between, and a second internal conduit substantially concentric with, and positioned internal of the first internal conduit, the second internal conduit comprising a first end, a second end, and a longitudinal bore having a longitudinal axis, and configured to form the second annulus between the first and second internal conduits, the burner body comprising fuel and oxidant inlet ports near the second ends of the conduits, and a burner tip defined by an inner wall and an outer wall connected via a crown, the outer wall removably fixed to the first end of the external conduit via an outer connection, and the inner wall removably fixed to the first end of the second internal conduit via an inner connection, the burner tip comprising a generally central flow passage configured to pass a combustible mixture therethrough, the generally central flow passage defined by the inner wall, wherein the burner tip crown and inner and outer walls comprise the same or different corrosion resistant and fatigue resistant material, at least one of the corrosion and/or fatigue resistance being greater than material comprising the external conduit under conditions experienced during submerged combustion melting of glass-forming materials.

Method embodiment 800 further comprises flowing an oxidant into the one or more oxidant inlet ports and through a third annulus defined by the second internal conduit and a central, concentric fuel conduit (box 804). Method embodiment 800 further comprises flowing a fuel into the one or more fuel inlet ports in the fuel conduit, the burner body and burner tip body configured such that flow of oxidant out of the third annulus and flow of fuel out of the fuel conduit causes the oxidant to intersect flow of the fuel in a mixing region at least partially defined by the generally central flow passage through the burner tip (box 806), combusting at least some of the fuel in the mixing region to form a flame and combustion products (box 808), and directing the flame and combustion products into solid and/or partially molten glass forming materials above the mixing region (box 810).

Method embodiment 900 of FIG. 14 comprises (box 902) flowing a cooling fluid through first and second annuli in a burner body, the burner body comprising an external conduit and a first internal conduit substantially concentric with, and positioned internal of the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming the first annulus for passing a cooling fluid there between, and a second internal conduit substantially concentric with, and positioned internal of the first internal conduit, the second internal conduit comprising a first end, a second end, and a longitudinal bore having a longitudinal axis, and configured to form the second annulus between the first and second internal conduits, the burner body comprising fuel and oxidant inlet ports near the second ends of the conduits, and a burner tip defined by an inner wall and an outer wall connected via a crown, the outer wall removably fixed to the first end of the external conduit via an outer connection, and the inner wall removably fixed to the first end of the second internal conduit via an inner connection, the burner tip comprising a generally central flow passage configured to pass a combustible mixture therethrough, the generally central flow passage defined by the inner wall, wherein the burner tip crown and inner and outer walls comprise the same or different corrosion resistant and fatigue resistant material, at least one of the corrosion and/or fatigue resistance being greater than material comprising the external conduit under conditions experienced during submerged combustion melting of glass-forming materials.

Method embodiment 900 further comprises flowing a fuel into the one or more fuel inlet ports and through a third annulus defined by the second internal conduit and a central, concentric oxidant conduit (box 904). Method embodiment 900 further comprises flowing an oxidant into the one or more oxidant inlet ports and through the oxidant conduit, the burner body and burner tip body configured such that flow of oxidant out of the oxidant conduit and flow of fuel out of the second annulus causes the oxidant to intersect flow of the fuel in a mixing region at least partially defined by the generally central flow passage through the burner tip (box 906), combusting at least some of the fuel in the mixing region to form a flame and combustion products (box 908), and directing the flame and combustion products into solid and/or partially molten glass forming materials above the mixing region (box 910).

Burner tip walls and crowns described herein may be made using a variety of processes, including molding, machining, and like processes. Burner tips of the present disclosure may be net-shape cast (or near-net shape cast) using rapid prototype (RP) molds. The matching or substantially matching burner tip inserts may similarly be RP molded and cast of the same or substantially similar shape, thereby ensuring proper cooling water velocity just under the surface of the burner tip material (inside the crown and inner and outer walls of the burner tips). Net-shape or near-net shape casting methods of making a variety of molds for producing a variety of complex products are summarized in patents assigned to 3D Systems, Inc., Rock Hill, S.C., U.S.A., for example U.S. Pat. No. 8,285,411. As summarized in the '411 patent, a number of technologies presently exist for the rapid creation of models, prototypes, and objects for limited run manufacturing. These technologies are generally called Solid Freeform Fabrication ("SFF") techniques. Some SFF techniques include stereolithography, selective deposition modeling, laminated object manufacturing, selective phase area deposition, multi-phase jet solidification, ballistic particle manufacturing, fused deposition modeling, particle deposition, laser sintering, film transfer imaging, and the like. Generally in SFF, complex parts are produced from a build material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a build material to fabricate the part in successive layers.

According to the '411 patent, SFF technologies may dramatically shorten the time to develop prototype parts, can produce limited numbers of parts in rapid manufacturing methods, and may eliminate the need for complex tooling and machining associated with conventional subtractive manufacturing methods, including the need to create molds for custom applications. In addition, customized parts can be directly produced from computer graphic data (e.g., computer-aided design (CAD) files) in SFF techniques. Generally, in most techniques of SFF, structures are formed in a layer by layer manner by solidifying or curing successive layers of a build material. For example, in stereolithography a tightly focused beam of energy, typically in the ultraviolet radiation band, is scanned across sequential layers of a liquid photopolymer resin to selectively cure resin of each layer to form a multilayered part. In selective laser sintering, a tightly focused beam of energy, such as a laser beam, is scanned across sequential layers of powder material to selectively sinter or melt powder in each layer to form a multilayered part. In selective deposition modeling, a build material is jetted or dropped in discrete droplets, or extruded through a nozzle, such that the build material becomes relatively rigid upon a change in temperature and/or exposure to actinic radiation in order to build up a three-dimensional part in a layerwise fashion. In another technique, film transfer imaging ("FTI"), a film transfers a thin coat of resin to an image plane area where portions of the resin corresponding to the cross-sectional layer of the part are selectively cured with actinic radiation to form one layer of a multilayer part. Certain SFF techniques require the part be suspended from a supporting surface such as a build pad, a platform, or the like using supports that join the part to the supporting surface. Prior art methods for generating supports are described in U.S. Pat. Nos. 5,595,703; 6,558,606; and 6,797,351. The Internet website of Quickparts.com, Inc., Atlanta, Ga., a subsidiary of 3D Systems Inc., has more information on some of these techniques and materials that may be used, and this information is summarized in some detail in Applicant's co-pending U.S. Patent App. No. US2016/0075587A1, published Mar. 17, 2016.

In operation of burners and SCMs of the present disclosure, in exemplary embodiments (such as that illustrated schematically in FIGS. 8 and 9) oxidant "O" may be fed to third annulus 19, and a fuel "F" to the longitudinal bore of central internal conduit 15. An inorganic glass-forming material is charged to the SCM. The mass flow rate of the inorganic material, for example glass-forming materials, is a function of the composition of the feed material, desired composition, viscosity, and temperature of the molten glass, the flame temperature of the burner(s), the burner geometry, for example burner exit, nozzle exit, and non-central passages sizes, the pressure in the mixing region of the burner, and other parameters. The process operating conditions are generally not independent values but have some degree of interaction. Oxygen-enhanced oxidant/fuel melting is markedly different than the traditional air-fuel melting processes. The general principle is to operate combustion in the mixing region of the burner in a manner that replaces some of the air with a separate source of oxygen. The overall combustion ratio may not change. The process of combining fuel and oxygen-enriched oxidant will, in most embodiments, primarily occur in mixing region 150, after the gases have passed over a flame arrestor safety device. Varying the oxygen content of the oxidant can control the flame temperature of the combustion gases.

In general, central internal conduit 19 may have an inner diameter (ID) ranging from about 1 inch up to about 5 inches (2.5 cm to 13 cm), or from about 2 inches up to about 4 inches (5 cm to 10 cm).

The total quantities of fuel and oxidant used by burners of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner embodiments of the present disclosure depends on the burner geometry used, but generally is at least about 15 meters/second (m/s). The upper limit of fuel velocity depends primarily on the desired penetration of flame and/or combustion products into the glass melt and the geometry of the burner; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate. The pressure in mixing region 150 of burners in accordance with the present disclosure should not exceed about 10 psig (170 kPa absolute pressure).

Additionally, certain burner embodiments of this disclosure may also be provided with stabilization of the flame with an auxiliary injection of fuel and/or oxidant gases. For example, a portion of the oxidant may be premixed with fuel as a primary oxidant, usually air, in conduit 15, in addition to a secondary or tertiary oxidant injection in annulus 19.

SC burners and methods of the present disclosure are intended to be used, for example, to replace combustion burners in existing SCMs, and/or to be used as the main source of energy in new SCMs.

A combustion process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures, materials, and/or acts described herein as performing the recited function and not only structural equivalents, but also equivalent structures.

What is claimed is:

1. A fluid-cooled submerged combustion burner comprising:
    a burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, the external conduit (10) and first internal conduit (12) forming a first annulus (11) for passing a cooling fluid there between, and a second internal conduit (14) substantially concentric with, and positioned internal of the first internal conduit (12), the second internal conduit (14) comprising a first end, a second end, and a longitudinal bore having a longitudinal axis, and configured to form a second annulus (13) between the first and second internal conduits (12, 14), and a central, concentric conduit (15) comprising a first end and a second end and configured to form a third annulus (19) between the second internal conduit (14) and the central, concentric conduit (15), the burner body comprising fuel and oxidant inlet ports near the second ends of the conduits; and a burner tip (4) defined by a right cylindrical inner wall (28) and a right cylindrical outer wall (30) connected via a curvilinear crown (32), the right cylindrical outer wall (30) removably fixed to the first end of the external conduit (10) via an outer connection, and the right cylindrical inner wall (28) removably fixed to the first end of the second internal conduit (14) via an inner connection, the burner tip (4) comprising a generally central flow passage configured to pass a combustible mixture therethrough, the generally central flow passage defined by the right cylindrical inner wall (28);

wherein the burner tip crown (32) and right cylindrical inner and outer walls (28, 30) comprise the same or different corrosion resistant and fatigue resistant material, at least one of the corrosion and/or fatigue resistance being greater than material comprising the external conduit (10) under conditions experienced during submerged combustion melting of glass-forming materials, and the burner body (6) and burner tip (4) are configured with the first end of the central, concentric conduit (15) recessed from the curvilinear crown (32) such that flow of oxidant or fuel out of the third annulus (19) and flow of fuel or oxidant out of the central, concentric conduit (15) causes the fuel and oxidant to intersect and mix sufficiently in a mixing region (150) to combust at least some of the fuel in the mixing region (150) and to form the combustible mixture and a flame in the mixing region (150) in the generally central flow passage defined by the right cylindrical inner wall (28) and a diverging portion of the curvilinear crown (32) downstream of the right cylindrical inner wall (28).

2. The submerged combustion burner of claim 1 wherein:
the first and second internal conduits and the external conduit comprises the same or different materials selected from the group consisting of carbon steel, stainless steel, titanium, and
the right cylindrical inner and outer walls and curvilinear crown comprise the same or different materials selected from the group consisting of noble metals, alloys of two or more noble metals, alloys of one or more base metals with one or more noble metals, copper, and copper alloys.

3. The submerged combustion burner of claim 1 wherein the inner connection is an inner flange, the inner flange comprising a first inner flange portion comprising a corrosion resistant and fatigue resistant material, and a second inner flange portion comprising material having corrosion and fatigue resistance less than that of the corrosion resistant and fatigue resistant material of the first inner flange portion;
and wherein
the outer connection is an outer flange, the outer flange comprising a first outer flange portion comprising a corrosion resistant and fatigue resistant material, and a second outer flange portion comprising material having corrosion and fatigue resistance less than that of the corrosion resistant and fatigue resistant material of the first outer flange portion.

4. The submerged combustion burner of claim 3 comprising an oxygen-resistant gasket material between the first and second inner flange portions.

5. The submerged combustion burner of claim 3 wherein the inner flange connection has a width that does not obstruct flow of coolant fluid or significantly increase pressure drop through the second annulus.

6. The submerged combustion burner of claim 1 wherein a distal portion of the right cylindrical outer wall overlaps and is concentric with, and adjacent to, the first end of the exterior conduit and brazed thereto using a first braze material.

7. The submerged combustion burner of claim 1 wherein a distal portion of the right cylindrical inner wall overlaps and is concentric with, and adjacent to, the first end of the second internal conduit and brazed thereto using a second braze material.

8. The submerged combustion burner of claim 6 wherein a distal portion of the right cylindrical inner wall overlaps and is concentric with, and adjacent to, the first end of the exterior conduit and brazed thereto using a second braze material, wherein the first and second braze materials may be the same or different.

9. The submerged combustion burner of claim 1 comprising threaded inner and out rings (31, 29) for mating with corresponding threads of the right cylindrical inner and outer walls (28, 30) of the burner tip (4), optionally with one or more seals selected from O-rings, gaskets, or other seals (33, 35), optionally with welded, soldered, or brazed areas (37, 39) for sealing.

10. A submerged combustion melter comprising:
a floor, a roof, and a sidewall structure connecting the floor and roof defining an internal space, at least a portion of the internal space comprising a melting zone; and
one or more submerged combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone;
at least one of the submerged combustion burners being a fluid-cooled submerged combustion burner comprising:
a burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, the external conduit (10) and first internal conduit (12) forming a first annulus (11) for passing a cooling fluid there between, and a second internal conduit (14) substantially concentric with, and positioned internal of the first internal conduit (12), the second internal conduit (14) comprising a first end, a second end, and a longitudinal bore having a longitudinal axis, and configured to form a second annulus (13) between the first and second internal conduits (12, 14), and a central, concentric conduit (15) comprising a first end and a second end and configured to form a third annulus (19) between the second internal conduit (14) and the central, concentric conduit (15), the burner body comprising fuel and oxidant inlet ports near the second ends of the conduits; and a burner tip (4) defined by a right cylindrical inner wall (28) and a right cylindrical outer wall (30) connected via a curvilinear crown (32), the right cylindrical outer wall (30) removably fixed to the first end of the external conduit (10) via an outer connection, and the right cylindrical inner wall (28) removably fixed to the first end of the second internal conduit (14) via an inner connection, the burner tip (4) comprising a generally central flow passage configured to pass a combustible mixture therethrough, the generally central flow passage defined by the right cylindrical inner wall (28);

wherein the burner tip crown (32) and right cylindrical inner and outer walls (28, 30) comprise the same or different corrosion resistant and fatigue resistant material, at least one of the corrosion and/or fatigue resistance being greater than material comprising the external conduit (10) under conditions experienced during submerged combustion melting of glass-forming materials, and the burner body (6) and burner tip (4) are configured with the first end of the central, concentric conduit (15) recessed from the curvilinear crown (32) such that flow of oxidant or fuel out of the third annulus (19) and flow of fuel or oxidant out of the central, concentric conduit (15) causes the fuel and oxidant to intersect and mix sufficiently in a mixing region (150) to combust at least some of the fuel in the mixing region (150) and to form the combustible mixture and a flame in the mixing region (150) in the generally central flow passage defined by the right cylindrical inner wall (28) and a portion of the curvilinear crown (32) downstream of the right cylindrical inner wall (28).

11. A fluid-cooled combustion burner comprising:

a burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, the external conduit (10) and first internal conduit (12) forming a first annulus (11) for passing a cooling fluid there between, and a second internal conduit (14) substantially concentric with, and positioned internal of the first internal conduit (12), the second internal conduit (14) comprising a first end, a second end, and a longitudinal bore having a longitudinal axis, and configured to form a second annulus (13) between the first and second internal conduits (12, 14), and a central, concentric conduit (15) configured to form a third annulus (19) between the second internal conduit (14) and the central, concentric conduit (15), the burner body comprising fuel and oxidant inlet ports near the second ends of the conduits; and a burner tip (4) defined by inner wall (28) and an outer wall (30) connected via a crown (32), the outer wall (30) removably fixed to the first end of the external conduit (10) via an outer connection, and the inner wall (28) removably fixed to the first end of the second internal conduit (14) via an inner connection, the burner tip (4) comprising a generally central flow passage configured to pass a combustible mixture therethrough, the generally central flow passage defined by the inner wall (28);

the burner tip crown (32) and inner and outer walls (28, 30) comprise the same or different corrosion resistant and fatigue resistant material, at least one of the corrosion and/or fatigue resistance being greater than material comprising the external conduit (10) under conditions experienced during submerged combustion melting of glass-forming materials, and the burner body (6) and burner tip (4) are configured such that flow of oxidant or fuel out of the third annulus (19) and flow of fuel or oxidant out of the central, concentric conduit (15) causes the fuel and oxidant to intersect and form the combustible mixture in a mixing region (150) in the generally central flow passage defined by the inner wall (28); and the burner tip (4) removably fastened to the burner body (6) by lower and upper flange connectors (41, 43) fastened together using one or more clips (45, 47), optionally with one or more seals (91, 93) selected from O-rings, gaskets, or other seals, optionally with one or more grooves in flange faces of the lower and upper flange connectors (41, 43).

\* \* \* \* \*